J. F. MATHENY.
CHECK ROW PLANTER.
APPLICATION FILED OCT. 30, 1915.
1,204,809.
Patented Nov. 14, 1916.
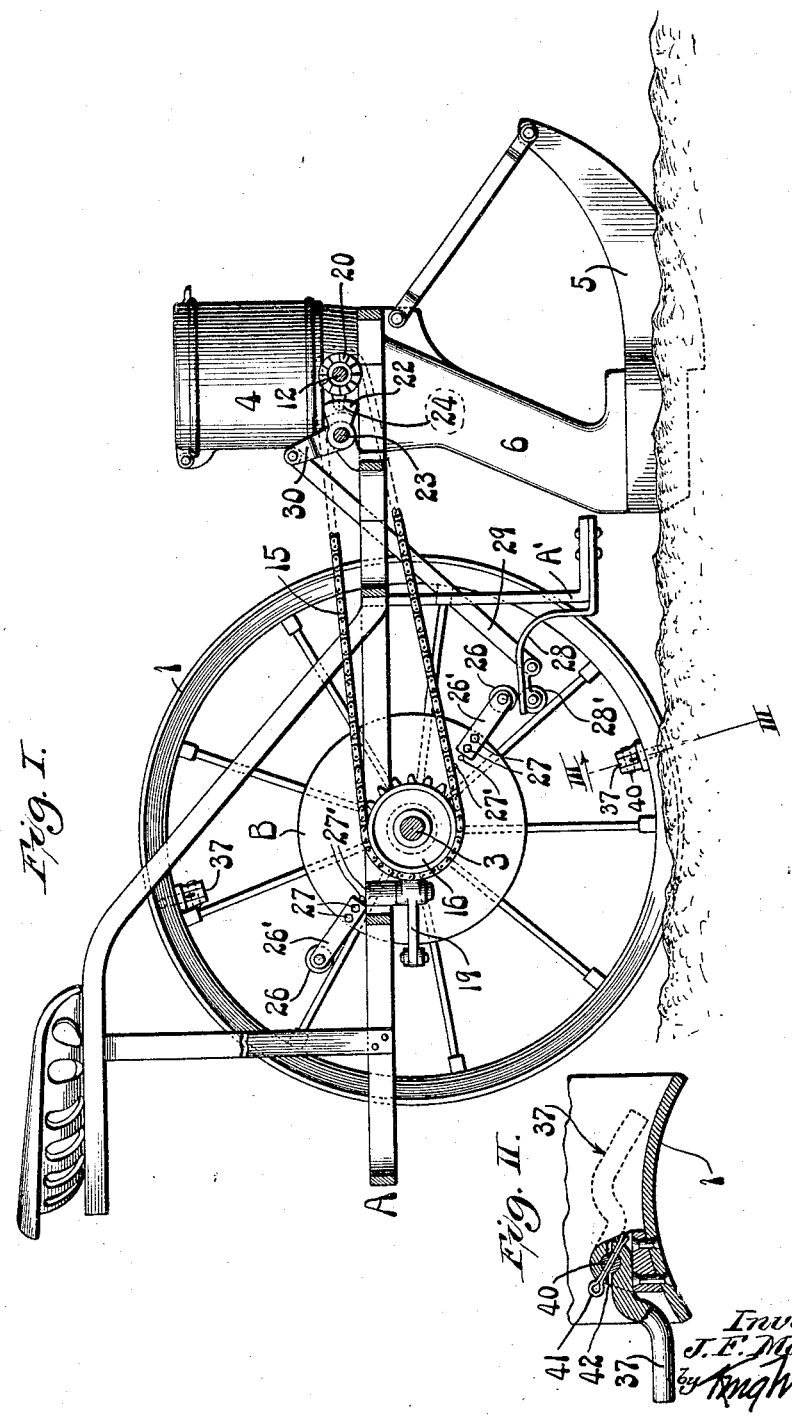

UNITED STATES PATENT OFFICE.

JOHN F. MATHENY, OF VALLEY PARK, MISSOURI.

CHECK-ROW PLANTER.

1,204,809.　　　Specification of Letters Patent.　　Patented Nov. 14, 1916.

Application filed October 30, 1915. Serial No. 58,760.

*To all whom it may concern:*

Be it known that I, JOHN F. MATHENY, a citizen of the United States of America, a resident of Valley Park, in the county of St. Louis, State of Missouri, have invented certain new and useful Improvements in Check-Row Planters, of which the following is a full, clear, and exact description, reference being had to the accompanying drawings, forming a part of this specification.

My invention relates to a planter of the general type shown in Patent No. 1,152,033, issued to me August 31, 1915, the present invention being an improvement on the structure shown in said patent.

Briefly stated, the preferred form of this invention includes an indicator carried by the planter in such a manner that it will mark the ground to indicate the points at which the seeds have been planted. While this indicator may be secured to the frame of the machine in any suitable manner, it is preferably pivoted to one of the ground wheels so that it may occupy two positions, namely, an operative position and an inoperative position. When the planting device is in service, the indicator or marker is located in its operative position, and when the planting device is not in service, for instance, while the machine is traveling along a roadway, the indicator may be shifted to its inoperative position wherein it will not strike the ground.

Figure I is a longitudinal section taken approximately through the center of the planter. Fig. II is an enlarged section on line III—III, Fig. I, illustrating the marker.

1 designates a ground wheel secured to an axle 3.

The axle is rotatably fitted to a main frame A, carrying seed hoppers 4 which contain the corn or other seed. Runners 5, at the front end of the main frame, are provided with seed chutes 6 adapted to receive the seed which drops from the hoppers 4.

The seed dropping mechanism is fully shown and described in Patent No. 1,152,033 to which I have previously referred, the member 20 being a clutch device secured to a seed dropper shaft 12 and provided with a finger 24 adapted to be actuated by a cam 22 to control the movements of the seed dropper as shown and described in the prior patent. The clutch device 20 is actuated by a sprocket chain 15 passing around a sprocket wheel 16 on the axle 3. The clutch controlling cam 22 is fixed to a rock shaft 23. The means for operating this rock shaft includes a tripper comprising a rotatable abutment carrier B secured to the axle 3 and provided with abutments 26.

Each abutment 26 is preferably a roller journaled in a pair of arms 26', said arms being secured to the abutment carrier B by means of bolts 27. A tripable arm 28, in the form of a spring, is arranged in the path of the abutment rollers 26 and connected to the rock shaft 23 by means of a connecting bar 29 and a crank arm 30, said crank arm being fixed to the rock shaft 23. The tripable arm 28 is preferably secured to the main frame A by means of a leg A' depending from said main frame, and the free portion of said tripable arm 28 is adapted to be bent downwardly by the abutment rollers 26 which move about the axis of the shaft or axle 3. The tripable arm 28 is preferably provided with a roller 28' adapted to be engaged by the abutment rollers 26. When the free portion of the tripable arm 28 is deflected downwardly by one of the abutment rollers 26, the connecting bar 29 and crank arm 30 are actuated with the result of shifting the cam 22 away from the finger 24. This operation releases the clutch controlling cam 22 and allows the clutch device to transmit movement to the seed dropping elements.

Marking fingers 37, carried by the ground wheel 1, mark the ground to indicate the points at which the seeds have been planted. Each marking finger 37 is pivotally supported by a rigid member 40, the latter being secured to the ground wheel 1, and when the machine is in service as a planter, each marking finger is locked in its operative position by means of a pin or key 41 (Fig. II) passing through a portion of the marking finger and also through the rigid member 40. When the machine is not in service as a planter, each marking finger 37 may be shifted to an inoperative position, shown by dotted lines in Fig. II, and when in this position the marking finger cannot be injured by striking the ground or roadway over which the machine is traveling. The pin or key 41 may be readily removed to permit the marking finger to be shifted from the position shown by dotted lines, and when the finger occupies the last mentioned position said pin or key may be inserted into an aperture 42 in a marking finger and through the rigid member 40, thus locking the marking finger in its inoperative position.

I claim:

In a planter, a seed dropping device, power mechanism including a ground wheel for operating said seed dropping device, a marking finger, a pivot member securing said marking finger to the ground wheel, said marking finger being movable from an operative position wherein it will strike the ground to an inoperative position wherein it cannot strike the ground, and a rigid locking device adapted to coöperate with said pivot member to rigidly secure said marking finger in its operative position and also adapted to coöperate with said pivot member to rigidly secure said marking finger in its inoperative position.

J. F. MATHENY.